United States Patent
Örnberg et al.

(10) Patent No.: US 12,051,970 B2
(45) Date of Patent: Jul. 30, 2024

(54) DEDICATED DCDC CONVERSION UNIT FOR SUPPLYING KEY-OFF ELECTRICAL LOADS FROM THE PROPULSION BATTERY IN A VEHICLE

(71) Applicant: Volvo Car Corporation, Gothenburg (SE)

(72) Inventors: Erik Örnberg, Billdal (SE); Sofia Lorensson, Trollhättan (SE); Stefan Sebastian Larqvist, Gothenburg (SE); Erik Jagre, Gothenburg (SE); Linas Brusokas, Nol (SE); Torbjörn Larsson, Allingsås (SE); Örjan Spjuth, Mölndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/804,756

(22) Filed: May 31, 2022

(65) Prior Publication Data

US 2023/0387795 A1 Nov. 30, 2023

(51) Int. Cl.
*H02M 3/00* (2006.01)
*H02J 1/08* (2006.01)
*H02J 7/00* (2006.01)

(52) U.S. Cl.
CPC ............. *H02M 3/003* (2021.05); *H02J 1/082* (2020.01); *H02J 7/0063* (2013.01); *H02J 2310/48* (2020.01)

(58) Field of Classification Search
CPC ........ H02M 3/003; H02J 1/082; H02J 7/0063; H02J 2310/48

USPC .......................................................... 307/9.1
See application file for complete search history.

(56) References Cited

U.S. PATENT DOCUMENTS

| | | | |
|---|---|---|---|
| 7,835,831 B2 | 11/2010 | Chung et al. | |
| 8,190,350 B2 | 5/2012 | Kortschak et al. | |
| 10,933,762 B2 | 3/2021 | Satake et al. | |
| 11,021,073 B1* | 6/2021 | Gauthier | B60L 3/0046 |
| 11,135,928 B2 | 10/2021 | Calzo et al. | |
| 11,183,833 B2 | 11/2021 | Shah et al. | |
| 11,260,771 B2 | 3/2022 | Oyama et al. | |
| 2001/0007419 A1* | 7/2001 | Tanaka | H02J 7/1415 323/285 |
| 2014/0183939 A1* | 7/2014 | Jiang | B60L 1/08 429/231.1 |
| 2019/0275968 A1 | 9/2019 | Kim et al. | |
| 2020/0324659 A1* | 10/2020 | Lo Calzo | B60L 58/20 |
| 2022/0080948 A1 | 3/2022 | Imamura et al. | |

(Continued)

OTHER PUBLICATIONS

Extended European Search Report received for European Patent Application Serial No. 23176315.2 dated Oct. 23, 2023, 10 pages.

(Continued)

*Primary Examiner* — Richard Tan
(74) *Attorney, Agent, or Firm* — Amin, Turocy & Watson, LLP (57) ABSTRACT

A device enabling dedicated DCDC conversion for key-off electrical loads is described. According to one or more embodiments, a device is provided comprising a battery, one or more main conversion units coupled to the battery, and one or more dedicated key-off conversion units coupled to the battery and to one or more key-off electrical modules.

20 Claims, 7 Drawing Sheets

(56) References Cited

U.S. PATENT DOCUMENTS

2022/0085723 A1  3/2022  Shafer
2022/0097563 A1  3/2022  Heydel et al.

OTHER PUBLICATIONS

Communication pursuant to Rule 69 EPC received for European Patent Application Serial No. 23176315.2 dated Dec. 11, 2023, 2 pages.

* cited by examiner

DEDICATED DCDC CONVERSION UNIT FOR SUPPLYING KEY-OFF ELECTRICAL LOADS FROM THE PROPULSION BATTERY IN A VEHICLE

TECHNICAL FIELD

This application relates to direct current to direct current (DCDC) conversion in an electric vehicle and more specifically to dedicated DCDC conversion for key-off electrical loads.

BACKGROUND

Key-off functions are any functions that can draw electrical power in a vehicle while the vehicle is turned off. For example, key-off functions in a vehicle can comprises functions such as operation of a radio or sound/entertainment system, a navigation system, power locks and windows, sensor equipment, operation of display screens, and operation of on-board computers. There is currently a growing demand for additional key-off functions in vehicles, leading to increased power draw.

Key-off functions often operate at relatively low voltage (e.g., 12V). Accordingly, in electrical vehicles, there is a need to provide electrical current at multiple voltages as propulsion systems typically operate at either medium voltages (e.g., 48V) or at high voltage (e.g., 400V or 800V). Existing electric vehicles handle this issue in one of two ways. Some existing vehicles provide 12V current by continuously cycling a 12V battery, which leads to increased wear and tear on the 12V battery and the need for frequent battery replacement. Other existing electric vehicles supply key-off elective loads by keeping the DCDC converter in the power train active and pulling power from the propulsion batteries. As the DCDC also needs to be capable of providing power for numerous other systems, this solution leads to high overhead energy consumption, leading to a waste of power and a decrease in range of the electric vehicle

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, circuits and/or devices are presented that enable dedicated DCDC conversion to key-off modules from a propulsion battery in an electric vehicle.

According to one or more embodiments, a device is provided. The device can comprise a battery, one or more main conversion units coupled to the battery and one or more dedicated key-off conversion units coupled to the battery and to one or more key-off electrical modules.

In some embodiments, the one or more main conversion units are coupled to the battery via a high voltage module, thereby enabling the main conversion unit to be disconnected from the battery.

In some embodiments, the one or more dedicated key-off conversion units down convert current from the battery to a lower voltage, such as 12V.

In some embodiments, the battery can comprise at least one of a high voltage or a medium voltage such as a battery operating at 48V, 400V or 800V.

In some embodiments, the battery can comprise a propulsion battery for an electric vehicle.

In some embodiments, the battery can comprise two or more batteries connected in a series.

An advantage of the disclose device is that the device can decrease the drain on a battery from key-off power consumption, leading to greater efficiency and vehicle range. Additionally, in some embodiments described below, the device can enable elimination of a 12V battery in an electric vehicle, thereby reducing vehicle weight and cost.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed towards enabling dedicated DCDC conversion for key-off electrical loads.

Figure 1:
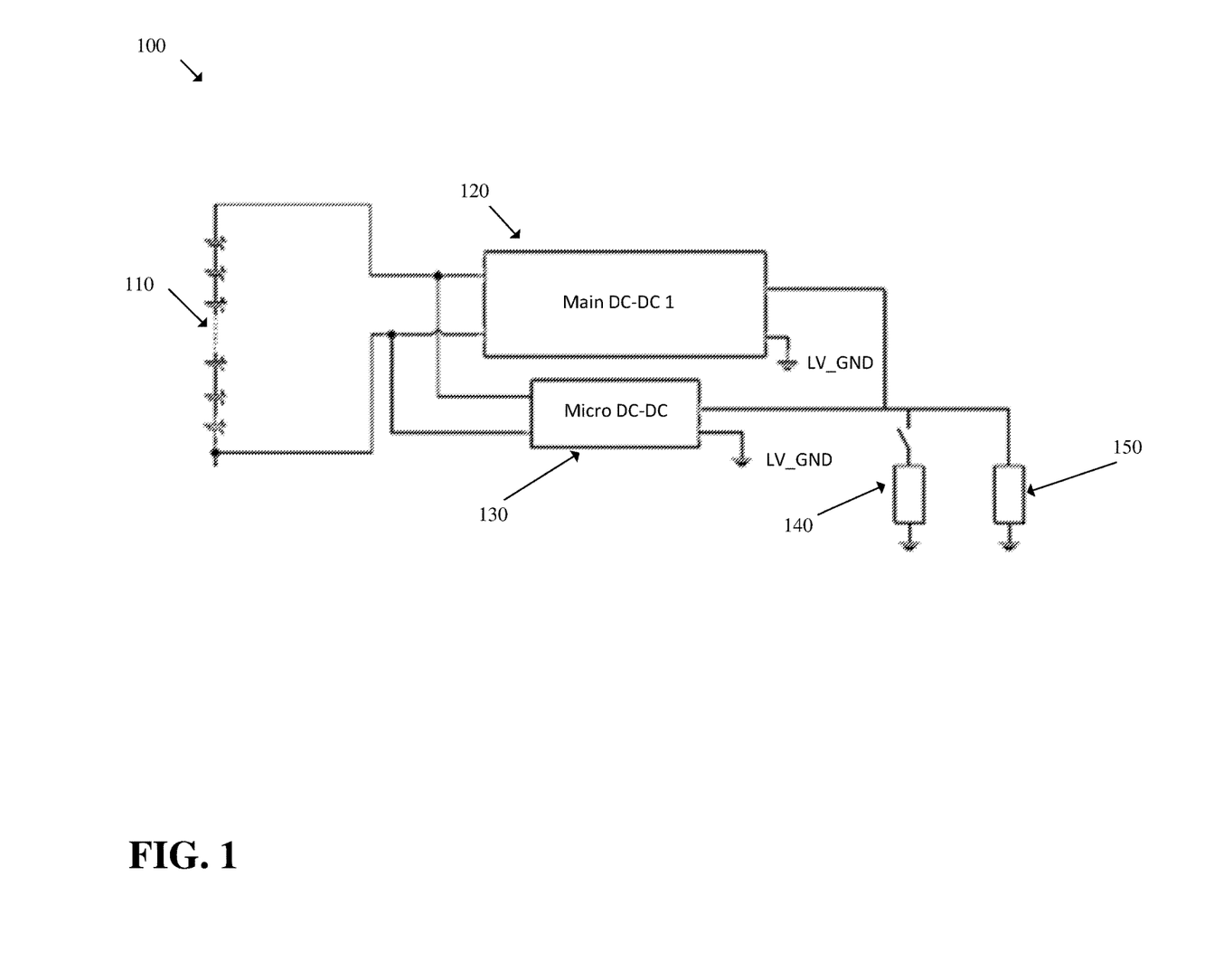
FIG. 1 illustrates a diagram of an example device that can enable dedicated DCDC conversion for key-off electrical loads.

Turning now to the drawings, FIG. 1 illustrates a diagram of an example device 100 that can enable dedicated DCDC conversion for key-off electrical loads in accordance with one or more embodiments of the disclosed subject matter. In an embodiment, device 100 comprises a battery 110, a main DCDC converter 120, a micro DCDC converter 130, key-off power consumers 150, and non-key-off consumers 140. Increasingly, various functions and modules of electric vehicles require power of various voltages. For example, the electric motors utilized for propulsion may require a relatively high voltage to operate. In contrast, other functions, such as key-off functions, may require power at relatively low voltages such as 12V. As such DCDC converters, such as the main DCDC converter 120 and/or micro DCDC converter 130 can convert power from one voltage to another voltage. For example, as shown, the main DCDC converter 120 is coupled to the battery 110 and to the key-off power consumers 150 and the non-key-off consumers 140. The main DCDC converter 120 (and similarly the micro DCDC converter) can convert power supplied by the battery 110 at a first voltage to a second voltage to supply to key-off power consumers 150 and/or non-key-off consumers 140. It should be appreciated that in one or more embodiments, battery 110 can comprise one or more batteries, battery cells, split batteries, and/or battery series and can comprise any physical and/or chemical structure capable of storing and discharging electrical current. In an embodiment, device 100 can be located within an electric vehicle or a hybrid vehicle. Additionally, battery 110 can be a propulsion or main battery of an electric vehicle. As defined herein, a propulsion or main battery can be any battery within an electric vehicle capable of powering one or more electric motors which cause the vehicle to move. In some embodiments, the battery 110 can be a medium voltage propulsion battery (e.g., 48V) or a high voltage propulsion battery (e.g., 400V or 800V).

Accordingly, when the electric vehicle is turned on or in use, the main DCDC converter 120 can supply power to both the key-off power consumers 150 and the non-key-off consumers 140 from the battery 110. However, in existing electric vehicles, an issue occurs when key-off power consumers 150 require power when the electric vehicle is turned off. For example, an on-board computer may need to update while the vehicle is turned off in order to not disrupt use of the vehicle. In this scenario, existing electric vehicles would either supply power to the key-off power consumers 150 by running the main DCDC converter 120 continuously, or by supplying power to the key-off modules from a separate 12V battery and using the main DCDC converter 120 to charge the 12V battery. The first option leads to large amounts of electrical waste, due to the relatively large overhead of operating the main DCDC converter 120, thus decreasing the range of the electric vehicle due to power drain from the battery 110. The second option can lead to rapid wear and tear of the 12V battery due to the numerous charge and discharge cycles, leading to increased maintenance time and cost.

In contrast, device 100 can solve these issues through the use of micro DCDC converter 130. For example, when the electric vehicle is turned off, instead of operating the main DCDC converter 120, the micro DCDC converter 130 can supply power to the key-off power consumers 150 from the battery. As the micro DCDC converter 130 is used to supply power only to the key-off power consumers 150 while the vehicle is turned off, the micro DCDC converter 130 does not need to supply the same relatively high amounts of power of the main DCDC converter 120. Additionally, as the majority of key-off functions operate using 12V, in an embodiment, the micro DCDC converter 130 can be designed specifically to convert power from the battery 110 to 12 V. Accordingly, the micro DCDC converter 130 can be designed to operate with less electrical overhead, and thus operate with less electrical waste when supplying power to the key-off power consumers 150 in comparison to the main DCDC converter 120. Therefore, the micro DCDC converter 130 can increase the range of the electric vehicle by decreasing the power consumption related to the key-off power consumers 150. Additionally, as the micro DCDC converter 130 has a relatively low electrical overhead, in some embodiments, a 12V battery can be eliminated entirely, thus reducing weight and cost of electric vehicles.

In an embodiment, device 100 can also comprise one or more power management computer devices (not shown). For example, a power management computer device can control the main DCDC converter 120 and/or the micro DCDC converter 130 based on what modules require power at any given time. In an embodiment, device 100 can comprise a first power management computer device to operate the main DCDC converter 120 and a second power management computer device to operate the micro DCDC 130.

Figure 2:
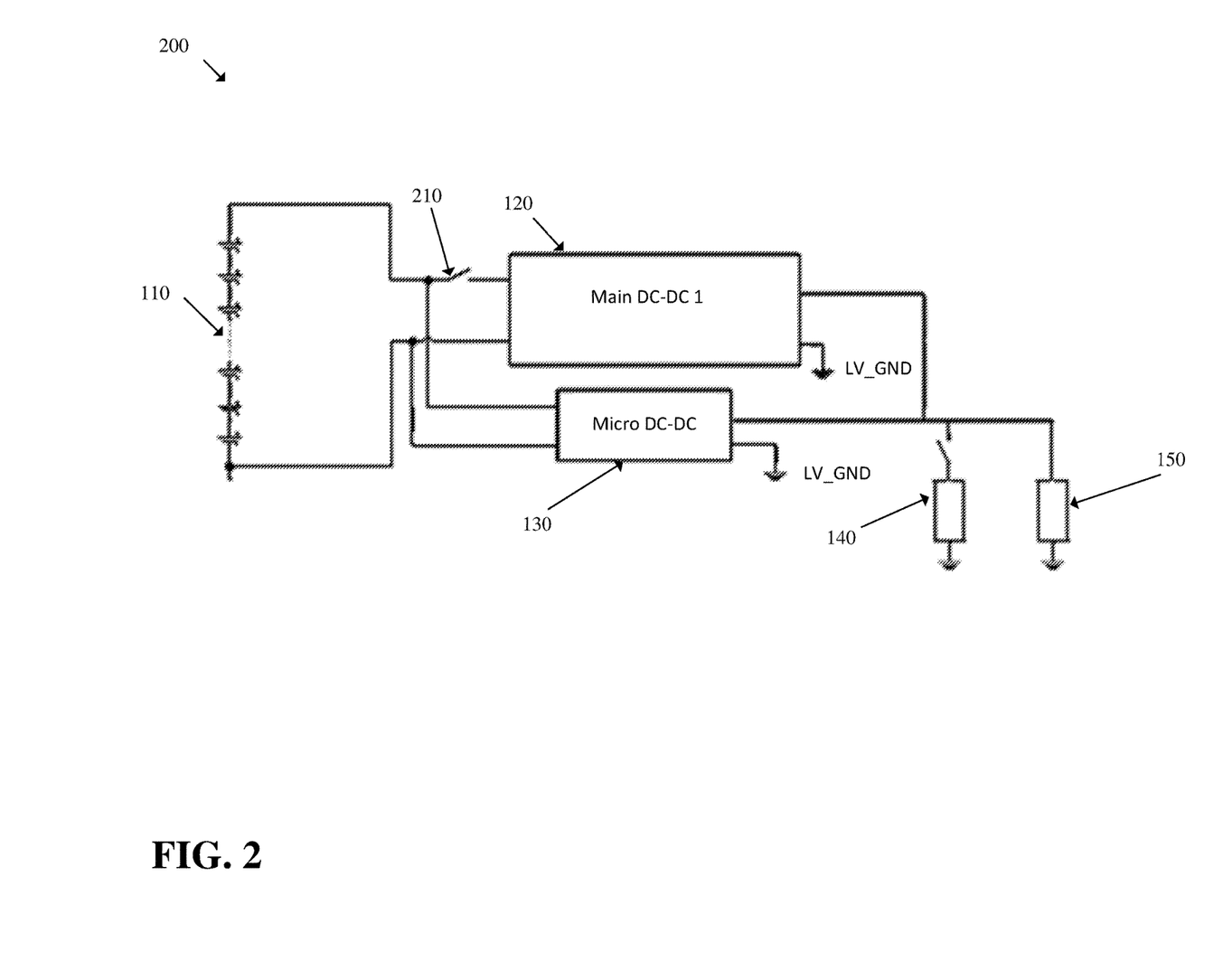
FIG. 2 illustrates a diagram of an example device that can enable dedicated DCDC conversion for key-off electrical loads.

FIG. 2 illustrates a diagram of an example device 200 that can enable dedicated DCDC conversion for key-off electrical loads in accordance with one or more embodiments of the disclosed subject matter. In an embodiment, device 200 comprises a battery 110, a main DCDC converter 120, a micro DCDC converter 130, key-off power consumers 150, and non-key-off consumers 140. Additionally, device 200 comprises high voltage supply system 210, shown as a contactor. When high voltage supply system 210 is active (e.g., the contactor is closed), the main DCDC converter 120 can receive current from the battery 110. However, when the high voltage supply system 210 is inactive (e.g., the contactor is open), then the main DCDC converter 120 cannot receive current from the battery 110. In this embodiment, the micro DCDC converter 130 can be coupled to the battery 110 before the high voltage supply system 210. Accordingly, the micro DCDC converter can operate when the high voltage supply system is inactive. In this embodiment, device 200 can further ensure power conservation and efficiency. For example, by opening the contactor of high voltage supply system 210, no power can be lost to leakage through the main DCDC converter 120, while the micro DCDC converter 130 can still supply power to the key-off power consumers 150 which may need power. It should be appreciated that through the use of micro DCDC converter 130, devices 100 and or 200 can facilitate reduction of use of or elimination of a 12V battery.

Figure 3:
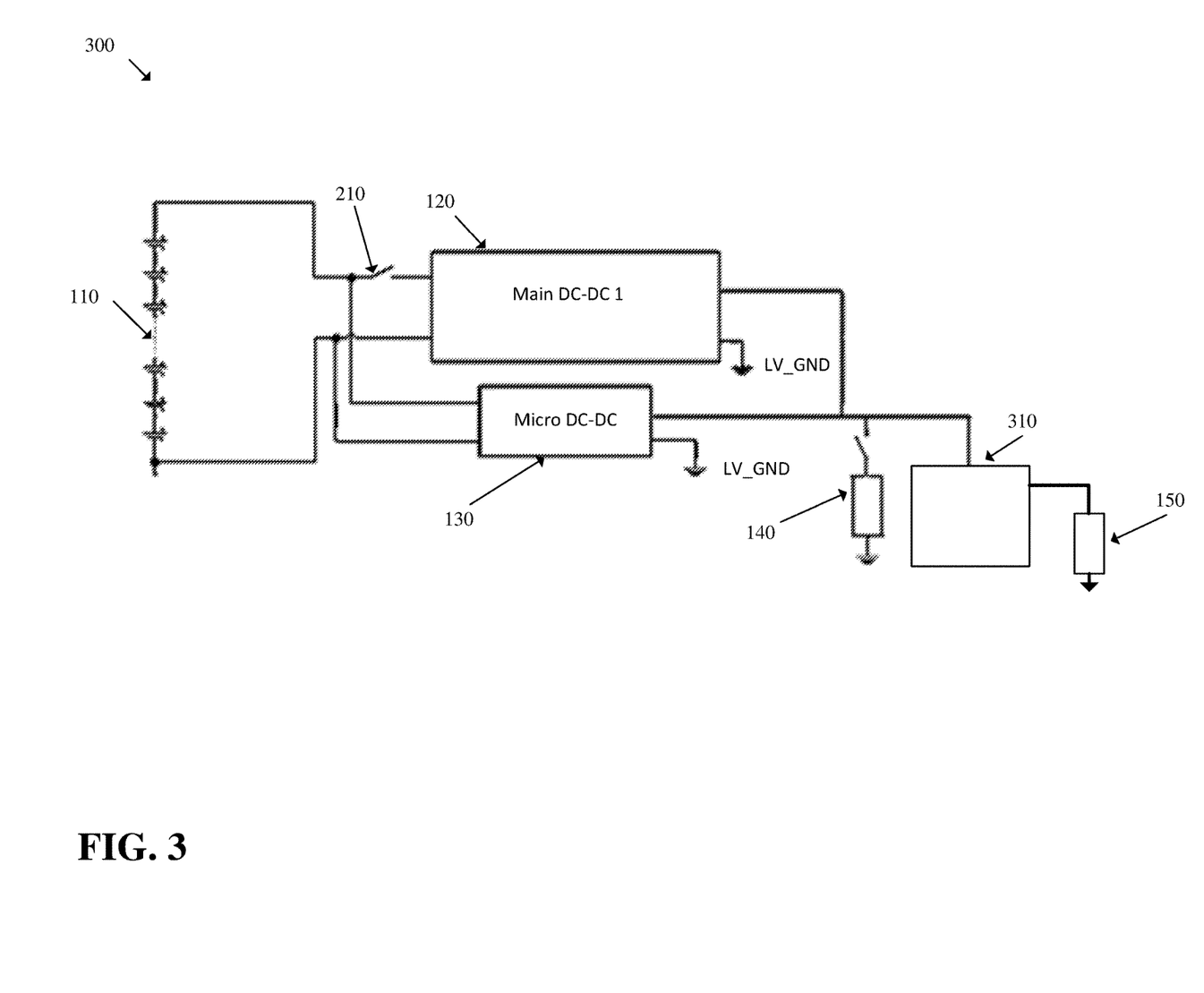
FIG. 3 illustrates a diagram of an example device that can enable dedicated DCDC conversion for key-off electrical loads.

FIG. 3 illustrates a diagram of an example device 300 that can enable dedicated DCDC conversion for key-off electrical loads in accordance with one or more embodiments of the disclosed subject matter. In an embodiment, device 300 comprises a battery 110, a main DCDC converter 120, a micro DCDC converter 130, key-off power consumers 150, and non-key-off consumers 140. Additionally, device 300 comprises a 12V battery 310. In some embodiments, it may be beneficial to retain a 12V battery in an electric vehicle. For example, a 12V battery can provide redundancy in supplying power to systems utilizing 12V if the main DCDC converter 120 and/or the micro DCDC converter 130 were to fail. Accordingly, as shown in FIG. 3, the 12V battery 310 can receive power from either the micro DCDC converter 130 or the main DCDC converter 120, depending on which is active.

Figure 4:
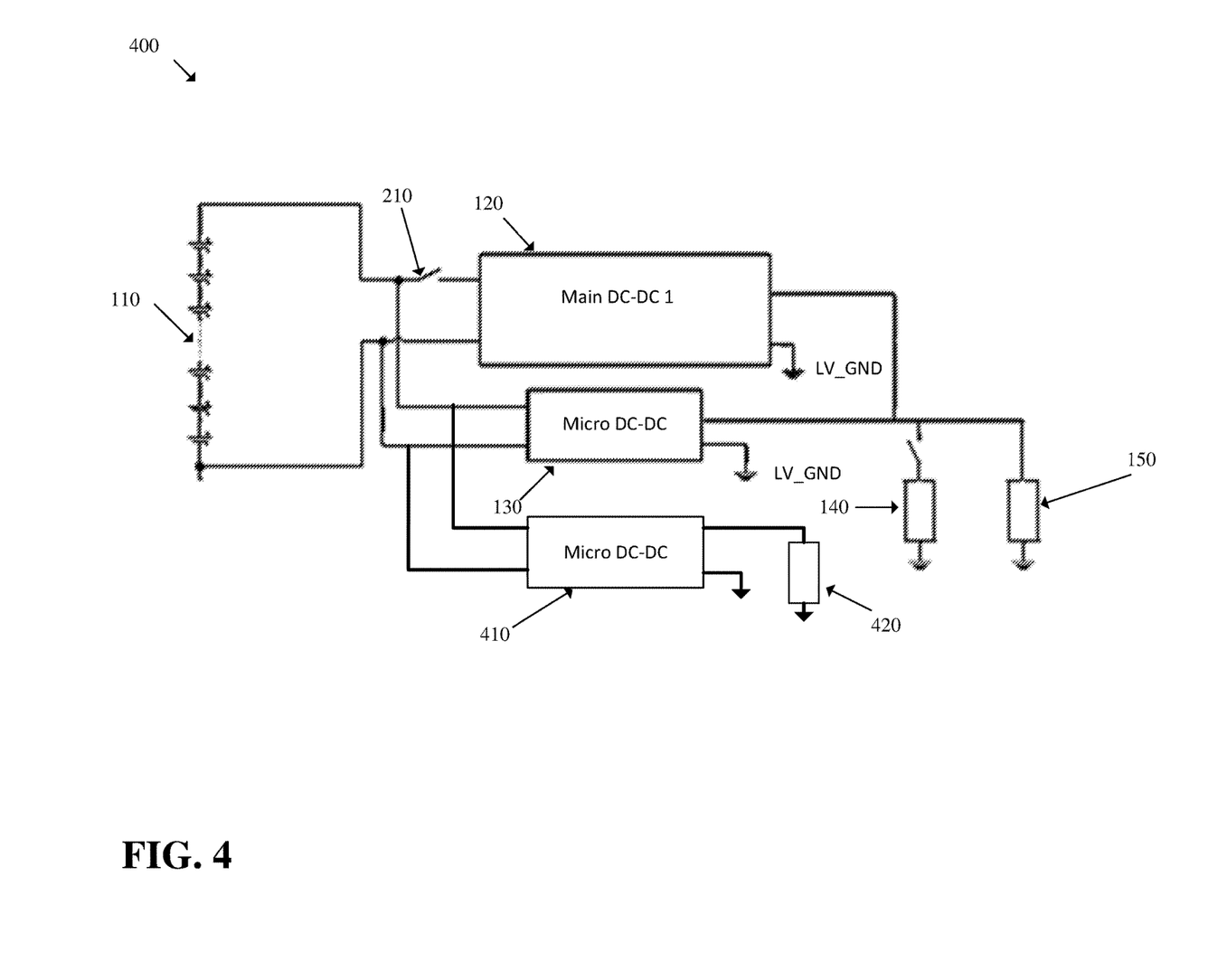
FIG. 4 illustrates a diagram of an example device that can enable dedicated DCDC conversion for key-off electrical loads.

FIG. 4 illustrates a diagram of an example device 400 that can enable dedicated DCDC conversion for key-off electrical loads in accordance with one or more embodiments of the disclosed subject matter. In an embodiment, device 400 comprises a battery 110, a main DCDC converter 120, a micro DCDC converter 130, key-off power consumers 150, and non-key-off consumers 140. Device 400 additionally comprises a second micro DCDC converter 410 and as second set of key-off power consumers 420. By including the second micro DCDC converter 410, device 400 can further improve efficiency in supplying power to key-off power consumers 150 and 420. For example, as the number of key-off power consumers increases, the micro DCDC 130 needs to be capable of supplying the power needs of the increased number of key-off power consumers. This could eventually create a situation in which micro DCDC 130 has similar efficiency issues as the main DCDC converter 120 as discussed above. That is, the overhead of operating micro DCDC converter 130 when only a limited number of key-off consumers require power can create the same issues as described above in relation to utilizing a single DCDC. Accordingly, the key-off power consumers can be divided into groupings such as key-off power consumers 150 and the second set of key-off power consumers 420 and a micro DCDC converter, such as micro DCDC converter 130 and second micro DCDC converter 410 can be assigned to each group or set of key-off power consumers. In this embodiment, efficiency and power conservation can be further improved. For example, if only key-off power consumers 150 require power, then the micro DCDC converter 130 can be active while the second micro DCDC converter 410 is inactive. Similarly, if the second group of key-off power consumers 420 requires power, then the second micro DCDC converter 410 can be active while the micro DCDC converter 130 is in active.

It should be appreciated that device 400 can be scaled to include any number of micro DCDC converters and/or groups of key-off power consumers. For example, device 400 can comprise a third micro DCDC coupled to a third group of key-off power consumers, a fourth micro DCDC coupled to a third group of key-off power consumers, etc. Accordingly, if the trend of increasing the number of key-off power consumers in electric vehicles continues, device 400 can be effectively and efficiently scaled accordingly.

Figure 5:
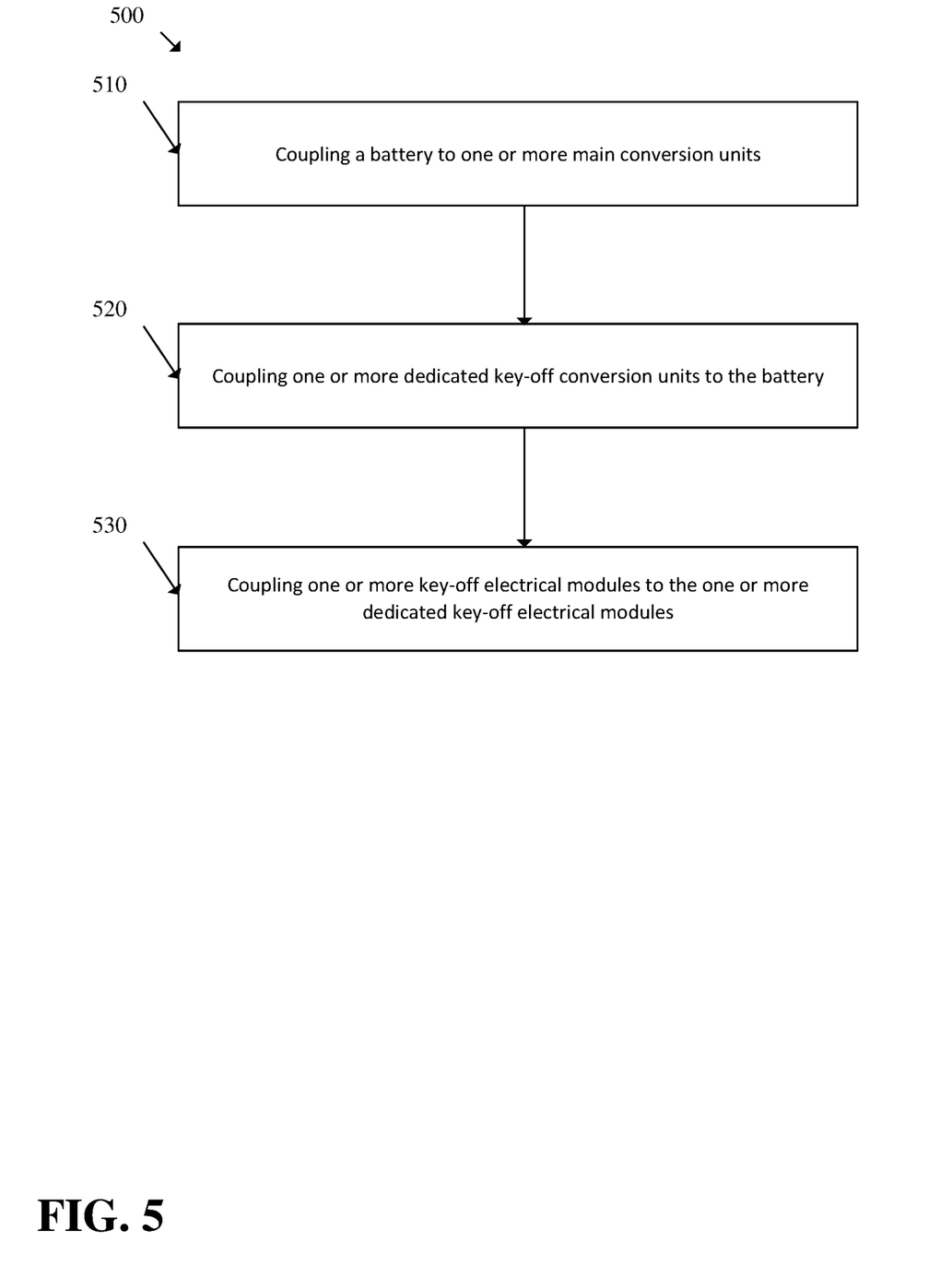
FIG. 5 illustrates a flow diagram of a non-limiting method of manufacture of a device enabling dedicated DCDC conversion for key-off electrical loads.

FIG. 5 illustrates a flow diagram of a non-limiting method 500 of manufacture of a device enabling dedicated DCDC conversion for key-off electrical loads in accordance with one or more embodiments of the disclosed subject matter.

At 510, method 500 can comprise coupling a battery (e.g., battery 110) to one or more main conversion units (e.g., main DCDC converter 120). In one or more embodiments, the battery can comprise one or more batteries, battery cells, split batteries, and/or battery series and can comprise any physical and/or chemical structure capable of storing and discharging electrical current. In an embodiment, the battery can be located within an electric vehicle. Additionally, the battery can be a propulsion or main battery of an electric vehicle. In some embodiments, the battery can be a medium voltage propulsion battery (e.g., 48V) or a high voltage propulsion battery (e.g., 400V or 800V). In an embodiment, the one or more main converters can also be coupled to one or more key-off modules (e.g., key-off power consumers 150) and/or one or more non-key-off consumers (e.g., non-key-off consumers 140). In an embodiment, the one or more main conversion units can convert power supplied by the battery in a first voltage to a second voltage.

At 520, method 500 can comprise coupling one or more dedicated key-off conversion units (e.g., micro DCDC converter 130 and/or second micro DCDC converter 410) to the battery (e.g., battery 110). In an embodiment, the one or more dedicated key-off conversion units can down convert power from the battery to 12V.

At 530, method 500 can comprise coupling one or more key-off electrical modules (e.g., key-off power consumers 150 and/or second grouping of key-off power consumers 420) to the one or more dedicated key-off conversion units (e.g., micro DCDC converter 130 and/or second micro DCDC converter 410).

Figure 6:
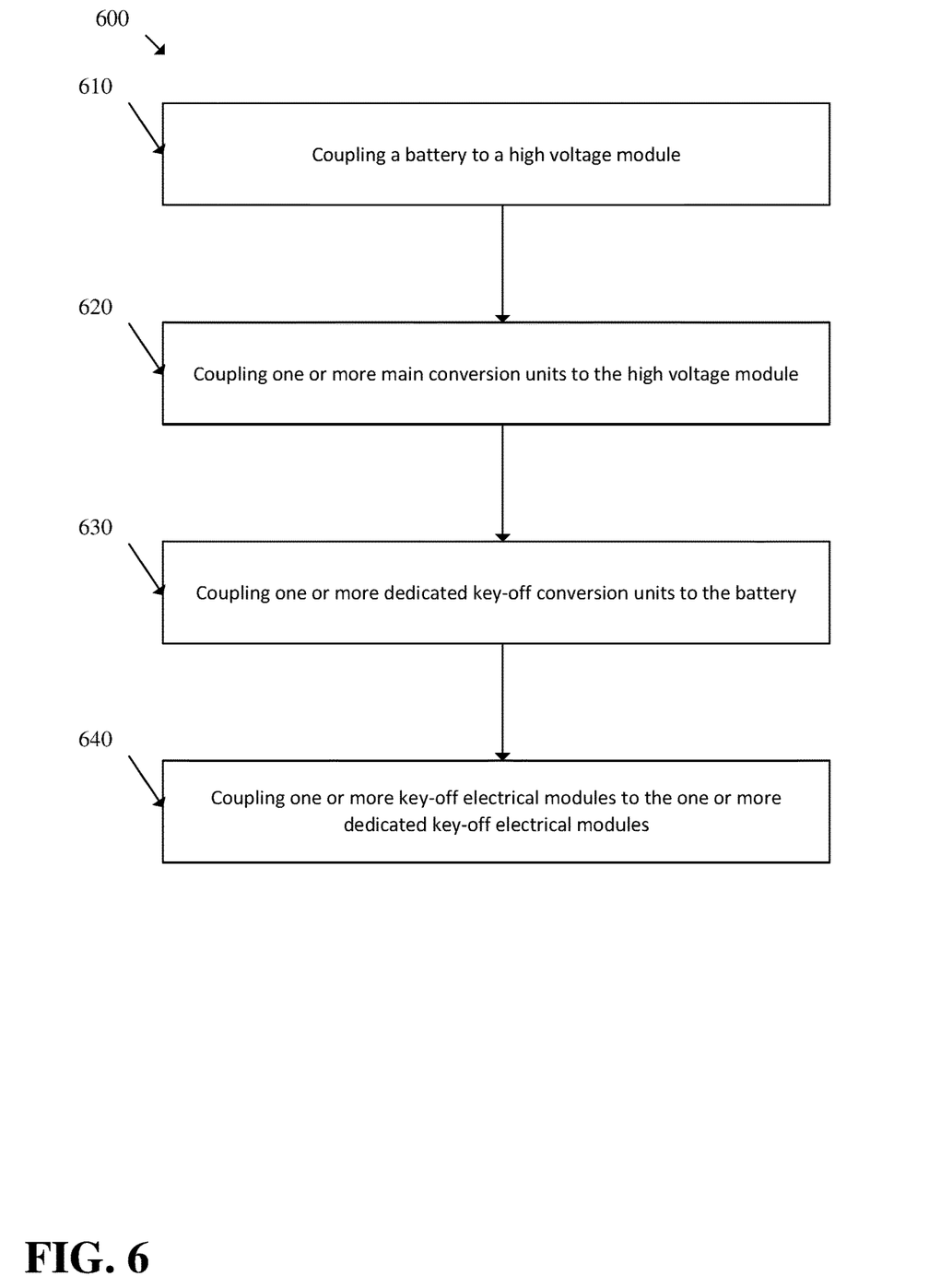
FIG. 6 illustrates a flow diagram of a non-limiting method of manufacture of a device enabling dedicated DCDC conversion for key-off electrical loads.

FIG. 6 illustrates a flow diagram of a non-limiting method 600 of manufacture of a device enabling dedicated DCDC conversion for key-off electrical loads in accordance with one or more embodiments of the disclosed subject matter.

At 610, method 600 can comprise coupling a battery (e.g., battery 110) to a high voltage module (e.g., high voltage supply system 210). In one or more embodiments, the battery can comprise one or more batteries, battery cells, split batteries, and/or battery series and can comprise any physical and/or chemical structure capable of storing and discharging electrical current. In an embodiment, the battery can be located within an electric vehicle. Additionally, the battery can be a propulsion or main battery of an electric vehicle. In some embodiments, the battery can be a medium voltage propulsion battery (e.g., 48V) or a high voltage propulsion battery (e.g., 400V or 800V).

At 620 method 600 can comprise coupling one or more main conversion units (e.g., main DCDC converter 120) to the high voltage module (e.g., high voltage supply system 210). In an embodiment, the one or more main converters can also be coupled to one or more key-off modules (e.g., key-off power consumers 150) and/or one or more non-key-off consumers (e.g., non-key-off consumers 140). In an embodiment, the one or more main conversion units can convert power supplied by the battery in a first voltage to a second voltage.

At 630, method 600 can comprise coupling one or more dedicated key-off conversion units (e.g., micro DCDC converter 130 and/or second micro DCDC converter 410) to the battery (e.g., battery 110). In an embodiment, the one or more dedicated key-off conversion units can down convert power from the battery to 12V.

At 640, method 600 can comprise coupling one or more key-off electrical modules (e.g., key-off power consumers 150 and/or second grouping of key-off power consumers 420) to the one or more dedicated key-off conversion units (e.g., micro DCDC converter 130 and/or second micro DCDC converter 410).

Figure 7:
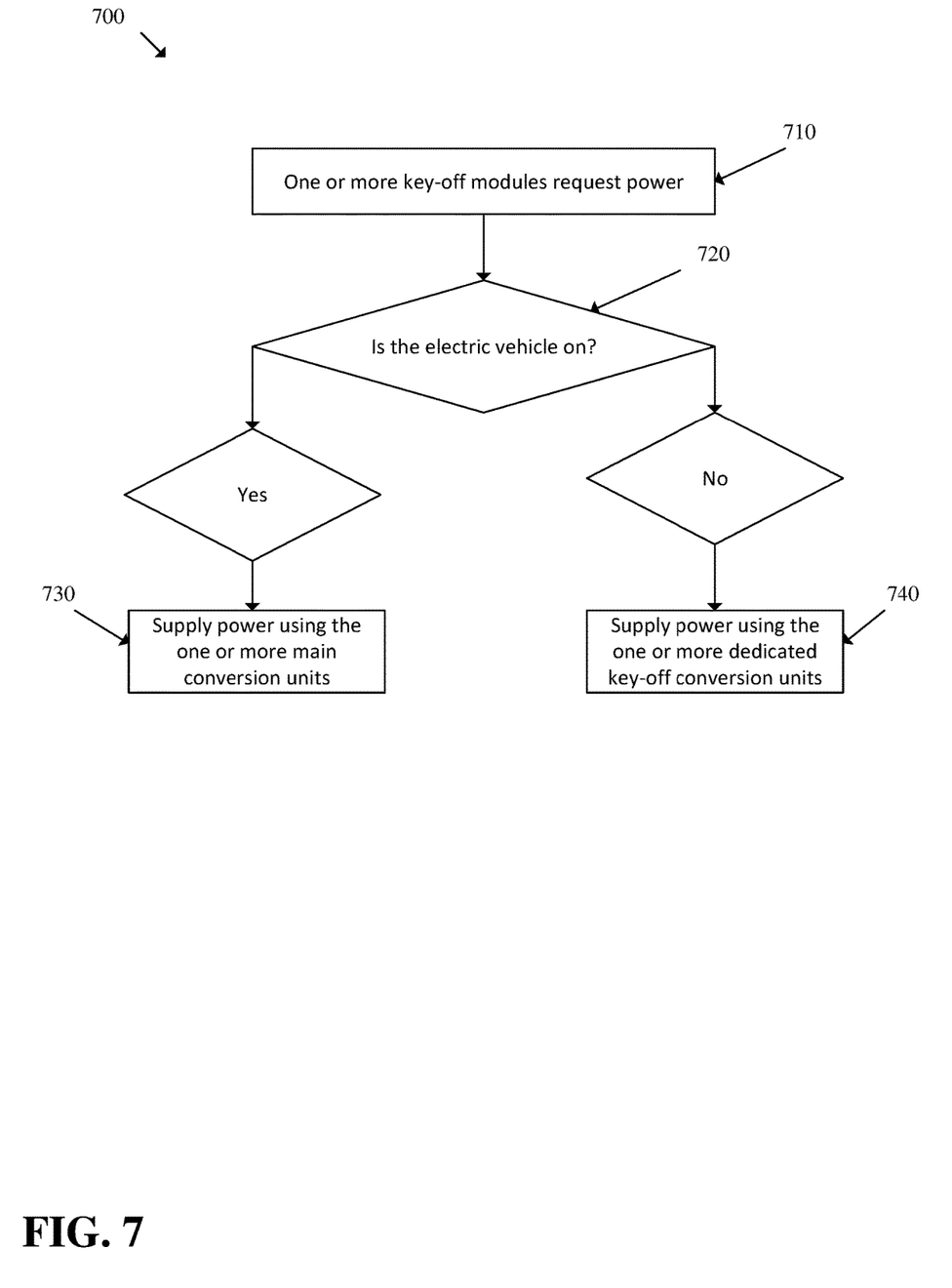
FIG. 7 illustrates a flow diagram of a non-limiting method of use of a device enabling dedicated DCDC conversion for key-off electrical loads.

FIG. 7 illustrates a flow diagram of a non-limiting method 700 of use of a device enabling dedicated DCDC conversion for key-off electrical loads in accordance with one or more embodiments of the disclosed subject matter.

At 710, method 700 can comprise one or more key-off modules requesting power. At 720, method 700 can comprise determining is the electric vehicle is on or off. If the vehicle is on, the power can be supplied by the one or more main conversion units, as shown at 730. If the vehicle is off, the power can be supplied by the one or more dedicated key-off conversion units, as shown at 740.

It should be appreciated that an electric vehicle comprising a device enabling dedicated DCDC conversion for key-off electrical loads, such as devices 100, 200, 300 and 400, has several advantages. For example, by utilizing a dedicated key-off conversion unit when the vehicle is off as opposed to the main conversion unit, the embodiments described herein can conserve battery power as the overhead of operating the dedicated key-off conversion unit is smaller than that of operating the main conversion unit. This can lead to electric vehicles with greater range, as key-off power modules will consume less battery power when the vehicle is off, thereby conserving battery power for driving operations when the vehicle is on. Additionally, one or more embodiments describe above can facilitate the elimination of 12V batteries in electric vehicles, thereby decreasing vehicle weight and manufacture and maintenance costs.

Further aspects of the invention are provided by the subject matter of the following clauses:

1. A device comprising:
   a battery;
   one or more main conversion units coupled to the battery; and
   one or more dedicated key-off conversion units coupled to the battery and to one or more key-off electrical modules.

2. The device of any preceding clause, wherein the one or more main conversion units are coupled to the battery via a high voltage module.
3. The device of any preceding clause, wherein the one or more dedicated key-off conversion units down convert current from the battery to a lower voltage.
4. The device of clause 3, wherein the one or more dedicated key-off conversion units down convert current from the battery to twelve volts.
5. The device of any preceding clause, wherein the battery comprises at least one of a high voltage or a medium voltage.
6. The device of any preceding clause, wherein the battery comprises a propulsion battery for an electric vehicle.
7. The device of any preceding clause, wherein the battery comprises two or more batteries.
8. A method comprising:
coupling a battery to a high voltage module;
coupling one or more main conversion units to the high voltage module;
coupling one or more dedicated key-off conversion units to the battery; and
coupling one or more key-off electrical modules to the dedicated one or more key-off conversion units.
9. The method of any preceding clause, wherein the one or more dedicated key-off conversion units down convert current from the battery to a lower voltage.
10. The method of clause 9, wherein the one or more dedicated key-off conversion units down convert current from the battery to twelve volts.
11. The method of any preceding clause, wherein the battery comprises at least one of a high voltage or a medium voltage.
12. The method of any preceding clause, wherein the battery comprises a propulsion battery for an electric vehicle.
13. The method of any preceding clause, wherein the battery comprises two or more batteries.
14. An electric vehicle comprising:
a battery;
one or more main conversion units coupled to the battery; and
one or more dedicated key-off conversion units coupled to the battery and to one or more key-off electrical modules.
15. The electric vehicle of any preceding clause, wherein the one or more main conversion units are coupled to the battery via a high voltage module.
16. The electric vehicle of any preceding clause, wherein the one or more dedicated key-off conversion units down convert current from the battery to a lower voltage.
17. The electric vehicle of clause 16, wherein the one or more dedicated key-off conversion units down convert current from the battery to twelve volts.
18. The electric vehicle of any preceding clause, wherein the battery comprises at least one of a high voltage or a medium voltage.
19. The electric vehicle of any preceding clause, wherein the battery comprises a propulsion battery.
20. The electric vehicle of any preceding clause, wherein the battery comprises two or more batteries.

What is claimed is:
1. A device comprising:
a first battery;
a main conversion unit, wherein a first input of the main conversion unit is coupled to the first battery;
a first dedicated key-off conversion unit, wherein a second input of the first dedicated key-off conversion unit is coupled to the first battery; and
a second dedicated key-off conversion unit, wherein a third input of the second dedicated key-off conversion unit is coupled to the first battery,
wherein the first battery comprises a higher voltage than a second battery,
wherein a first output of the main conversion unit is coupled to and provides power to the second battery,
wherein a second output of the first dedicated key-off conversion unit is coupled to and provides power to the second battery,
wherein the second battery is coupled to a first set of one or more key-off electrical modules,
wherein a third output of the second dedicated key-off conversion unit is coupled to and provides power to a second set of one or more key-off electrical modules,
wherein the main conversion unit and the first dedicated key-off conversion unit are not coupled to the second set of one or more key-off electrical modules, and
wherein the main conversion unit operates with a first electrical overhead when producing a defined output voltage that is greater than a second electrical overhead of the first dedicated key-off conversion unit and a third electrical overhead of the second dedicated key-off conversion unit when producing the defined output voltage.
2. The device of claim 1, wherein the input of the main conversion unit is coupled to the first battery via a high voltage module.
3. The device of claim 1, wherein the first dedicated key-off conversion unit down converts current from the first battery to a lower voltage.
4. The device of claim 3, wherein the first dedicated key-off conversion unit down converts the current from the first battery to twelve volts.
5. The device of claim 1, wherein the first battery comprises at least one of a high voltage or a medium voltage.
6. The device of claim 1, wherein the first battery comprises a propulsion battery for an electric vehicle.
7. The device of claim 1, wherein the first output of the main conversion unit is further coupled to one or more non-key-off electrical modules.
8. A method comprising:
coupling a first battery to a high voltage module;
coupling a first input of a main conversion unit to the high voltage module;
coupling a second input of a first dedicated key-off conversion unit to the first battery;
coupling a third input of a second dedicated key-off conversion unit to the first battery, wherein the main conversion unit operates with a first electrical overhead when producing a defined output voltage that is greater than a second electrical overhead of the first dedicated key-off conversion unit and a third electrical overhead of the second dedicated key-off conversion unit when producing the defined output voltage;
coupling a first output of the main conversion unit to a second battery, wherein the first output provides power to the second battery, and wherein the first battery comprises a higher voltage than the second battery;
coupling a second output of the first dedicated key-off conversion unit to the second battery, wherein the second output provides power to the second battery;
coupling a first set of one or more key-off electrical modules to the second battery;

coupling a third output of the second dedicated key-off conversion unit to a second set of one or more key-off electrical modules, wherein the third output provides power to the second set of one or more key-off electrical modules, wherein the main conversion unit and the first dedicated key-off conversion unit are not coupled to the second set of one or more key-off electrical modules.

9. The method of claim 8, wherein the first dedicated key-off conversion unit down converts current from the first battery to a lower voltage.

10. The method of claim 9, wherein the first dedicated key-off conversion unit down converts the current from the first battery to twelve volts.

11. The method of claim 8, wherein the first battery comprises at least one of a high voltage or a medium voltage.

12. The method of claim 8, wherein the first battery comprises a propulsion battery for an electric vehicle.

13. The method of claim 8, wherein the first output of the main conversion unit is further coupled to one or more non-key-off electrical modules.

14. An electric vehicle comprising:
a first battery;
a main conversion unit, wherein a first input of the main conversion unit is coupled to the first battery;
a first dedicated key-off conversion unit, wherein a second input of the first dedicated key-off conversion unit is coupled to the first battery; and
a second dedicated key-off conversion unit, wherein a third input of the second dedicated key-off conversion unit is coupled to the first battery,
wherein the first battery comprises a higher voltage than a second battery,
wherein a first output of the main conversion unit is coupled to and provides power to the second battery,
wherein a second output of the first dedicated key-off conversion unit is coupled to and provides power to the second battery,
wherein the second battery is coupled to a first set of one or more key-off electrical modules,
wherein a third output of the second dedicated key-off conversion unit is coupled to and provides power to a second set of one or more key-off electrical modules,
wherein the main conversion unit and the first dedicated key-off conversion unit are not coupled to the second set of one or more key-off electrical modules, and
wherein the main conversion unit operates with a first electrical overhead when producing a defined output voltage that is greater than a second electrical overhead of the first dedicated key-off conversion unit and a third electrical overhead of the second dedicated key-off conversion unit when producing the defined output voltage.

15. The electric vehicle of claim 14, wherein the input of the main conversion unit is coupled to the first battery via a high voltage module.

16. The electric vehicle of claim 14, wherein the first dedicated key-off conversion unit down converts current from the first battery to a lower voltage.

17. The electric vehicle of claim 16, wherein the first dedicated key-off conversion unit down converts the current from the first battery to twelve volts.

18. The electric vehicle of claim 14, wherein the first battery comprises at least one of a high voltage or a medium voltage.

19. The electric vehicle of claim 14, wherein the first battery comprises a propulsion battery for an electric vehicle.

20. The electric vehicle of claim 14, wherein the first output of the main conversion unit is further coupled to one or more non-key-off electrical modules.

* * * * *